(12) United States Patent
Miller et al.

(10) Patent No.: US 12,215,753 B2
(45) Date of Patent: Feb. 4, 2025

(54) SOUND ISOLATION SUSPENSION SYSTEM

(71) Applicant: KONINKLIJKE PHILIPS N.V., Eindhoven (NL)

(72) Inventors: Kevin Arnold Miller, Bellevue, WA (US); Michiel Allan Aurelius Schallig, Drachten (NL); Hermanus Mathias Joannes Rene Soemers, Mierlo (NL); Daniel James Faulkner, Portland, OR (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 92 days.

(21) Appl. No.: 17/770,403

(22) PCT Filed: Oct. 16, 2020

(86) PCT No.: PCT/EP2020/079160
§ 371 (c)(1),
(2) Date: Apr. 20, 2022

(87) PCT Pub. No.: WO2021/078637
PCT Pub. Date: Apr. 29, 2021

(65) Prior Publication Data
US 2022/0381318 A1     Dec. 1, 2022

Related U.S. Application Data

(60) Provisional application No. 62/923,838, filed on Oct. 21, 2019.

(51) Int. Cl.
*F16F 15/04*     (2006.01)

(52) U.S. Cl.
CPC .................................. *F16F 15/04* (2013.01)

(58) Field of Classification Search
CPC .................................. F16F 15/04; F16F 7/00
(Continued)

(56) References Cited

U.S. PATENT DOCUMENTS 3,323,764 A * 6/1967 Johnson .................. F16F 15/04
                                                          267/152
5,197,460 A * 3/1993 Ito .......................... A61C 17/02
                                                          601/162

(Continued)

FOREIGN PATENT DOCUMENTS

JP     2006112519 A     4/2006
JP     2010015648 A     1/2010

(Continued)

OTHER PUBLICATIONS

International Search Report and Written Opinion Dated Jan. 29, 2021 For International Application No. PCT/EP2020/079160 Filed Oct. 16, 2020.

*Primary Examiner* — Muhammad Ijaz

(57) ABSTRACT

A suspension system (22) configured to minimize transmission of acoustic and vibrational energy in a device, comprising: (i) a rigid support (24): (ii) an operative element (16) positioned within the rigid support and comprising a drive frequency when the device is in operation; and (iii) a resilient element (26) engaging the rigid support and configured to create a resilient force against vibrations generated by the operative element in one or more degrees of freedom: wherein the natural frequency of a suspension mode in one or more of the degrees of freedom are tuned into a narrow resonant frequency range by the suspension, and wherein the resonant frequency is greater than the drive frequency.

13 Claims, 13 Drawing Sheets

(58) Field of Classification Search
USPC ......................................................... 248/631
See application file for complete search history.

(56) References Cited

U.S. PATENT DOCUMENTS

| | | | | |
|---|---|---|---|---|
| 5,218,956 A | * | 6/1993 | Handler | A61C 17/032 |
| | | | | 601/165 |
| 5,246,367 A | * | 9/1993 | Ito | A61C 17/02 |
| | | | | 433/80 |
| 5,310,157 A | * | 5/1994 | Platus | F16F 15/073 |
| | | | | 248/619 |
| 7,670,141 B2 | * | 3/2010 | Thomas | A61C 17/0202 |
| | | | | 433/80 |
| 7,959,597 B2 | * | 6/2011 | Baker | A61M 1/772 |
| | | | | 604/28 |
| 7,993,113 B2 | * | 8/2011 | Namiki | F04D 29/601 |
| | | | | 417/423.4 |
| 8,113,832 B2 | * | 2/2012 | Snyder | A61C 17/0202 |
| | | | | 601/162 |
| 8,801,667 B2 | * | 8/2014 | Taylor | A61M 3/0279 |
| | | | | 604/118 |
| 8,888,727 B2 | * | 11/2014 | Boyd | A61C 19/02 |
| | | | | 601/165 |
| 9,884,729 B1 | * | 2/2018 | Nix | F16M 13/02 |
| 11,213,376 B2 | | 1/2022 | Senff et al. | |
| 2004/0017033 A1 | * | 1/2004 | Ichikawa | F16F 7/108 |
| | | | | 267/140.14 |
| 2004/0209222 A1 | * | 10/2004 | Snyder | A61C 17/02 |
| | | | | 601/162 |
| 2007/0151819 A1 | * | 7/2007 | Schmidt | F16F 15/046 |
| | | | | 188/371 |
| 2007/0256428 A1 | * | 11/2007 | Unger | H02K 11/33 |
| | | | | 62/295 |
| 2008/0085202 A1 | | 4/2008 | Namiki et al. | |
| 2011/0085152 A1 | * | 4/2011 | Nishino | G03F 7/709 |
| | | | | 355/72 |
| 2013/0295520 A1 | | 11/2013 | Hsieh | |
| 2014/0080082 A1 | * | 3/2014 | Lowe | A61C 19/003 |
| | | | | 433/6 |
| 2014/0217664 A1 | * | 8/2014 | Willems | B60G 11/56 |
| | | | | 267/34 |
| 2015/0060633 A1 | * | 3/2015 | Han | B60K 5/1208 |
| | | | | 248/562 |
| 2017/0211655 A1 | * | 7/2017 | Chaen | F16F 15/04 |
| 2017/0252251 A1 | | 9/2017 | Williams et al. | |
| 2019/0058370 A1 | * | 2/2019 | Tinney | F16F 15/04 |
| 2021/0033158 A1 | | 2/2021 | Sakamoto | |
| 2021/0207667 A1 | * | 7/2021 | Fichtner-Pflaum | |
| | | | | H02K 7/1025 |
| 2022/0381318 A1 | * | 12/2022 | Miller | F16F 15/04 |

FOREIGN PATENT DOCUMENTS

| | | |
|---|---|---|
| JP | 2011220452 A | 11/2011 |
| JP | 2019002381 A | 1/2019 |

* cited by examiner

SOUND ISOLATION SUSPENSION SYSTEM

CROSS-REFERENCE TO RELATED APPLICATIONS

This application is the U.S. National Phase application under 35 U.S.C. § 371 of International Application No. PCT/EP2020/079160, filed on Oct. 16, 2020, which claims the benefit of U.S. Provisional Application No. 62/923,838, filed Oct. 21, 2019. Priority is claimed under 35 U.S.C. § 119 to International Application No. PCT/EP2020/079160 and U.S. Provisional Application No. 62/923,838, the disclosures of which are hereby incorporated by reference herein.

FIELD OF THE DISCLOSURE

The present disclosure is directed generally to a suspension system configured to minimize transmission of acoustic and vibrational energy generated by an operative element to reduce audible noise perceived by a user.

BACKGROUND

Due to moving or vibrating components, devices can be noisy and exhibit unwanted vibrations. The noise or vibration associated with a consumer device may limit or prevent use of the device due to the volume of sound for the user or concern of the user for other individuals who may be disturbed. This can lead to dissatisfaction with a consumer device, inconsistent use of the device, or failure to use the device, thus reducing or preventing the full potential benefit that can be gained by use of the device.

An oral irrigator is just one example of a consumer device that generates unwanted noise and vibration. An oral irrigator pumps liquid from a fluid reservoir at low pressure through a pump into a high pressure line that exits through a nozzle. The principal sources of noise and vibration are the fluid path, pump and drive train, and nozzle. The pump and drive train will be the source for most of this vibration, and creates sound and vibration impulses at a fixed frequency and its harmonics. Transmission of these vibrations to surfaces of the product housing generates the majority of sound heard by a user. These primary sound and vibration sources then transmit to secondary sources, which are energized from the principal frequency and/or harmonics to move parts exposed to the user and/or external air, radiating sound vibrations from the principal forces to the user. Additionally, secondary sound sources can be magnified by resonances and intermittent contacts. Indeed, secondary sound sources with large surface areas generate sound much more efficiently for a given vibration.

Prior art devices use several different mechanisms or designs in an attempt to reduce the noise and vibration associated with a moving or vibrating component. For example, some systems attempt to modify the moving or vibrating component to lessen noise and vibration, which may negatively affect operation and/or effectiveness of the device. Other devices employ suspension systems that may reduce vibrations but they are poorly designed and are typically bulky, expensive, and minimally effective. Additionally, prior art devices are designed such that the suspension system comprises a resonant frequency that is less than the drive frequency.

SUMMARY OF THE DISCLOSURE

There is a continued need for suspension systems that reduce the transmission of noise and vibrations from an internal component to external surfaces. Various embodiments and implementations herein are directed to a method and system configured to minimize transmission of acoustic and vibrational energy. The system comprises an internal rigid support, and an operative element such as a pump assembly positioned within the rigid support. The operative element comprises a drive frequency when the device is in operation. The system also includes an internal suspension comprising a resilient element, such as a spring, engaging the rigid support and configured to create a resilient force against vibrations generated by the operating element in one or more degrees of freedom. The system is configured such that the natural frequency in one or more of the degrees of freedom of the suspension system are tuned into a narrow resonant frequency range by the suspension, such that the resonant frequency is greater than the drive frequency. The system may also include a second resilient element engaging the rigid support, where the natural frequencies in one or more of the degrees of freedom of the suspension system are tuned into a narrow resonant frequency range by the suspension and the second resilient element.

Sound loudness as perceived by a user can be defined by the A-weighting scale. A user can perceive frequencies in the mid-range much easier than other ranges, and thus hears frequencies in this range louder than lower and higher frequencies. According to just one embodiment of a possible device, the primary frequencies from the operative element of the device are 8 to 30 Hz, with those below 20 Hz not being heard. The lower the frequency from the pump, the less reaction force from the pump. Utilizing a suspension with a natural frequency in the 40-60 Hertz range isolates vibrations that are easily heard, reducing A-weighted sound power while providing a low-cost practical suspension to build into the device.

Generally, in one aspect, a suspension system configured to minimize transmission of acoustic and vibrational energy in a device is provided. The suspension system includes: (i) a rigid support; (ii) an operative element positioned within the rigid support and comprising a drive frequency when the device is in operation; and (iii) a resilient element engaging the rigid support and configured to create a resilient force against vibrations generated by the operative element in one or more degrees of freedom; wherein the natural frequency of a suspension mode in one or more of the degrees of freedom are tuned into a narrow resonant frequency range by the suspension, and wherein the resonant frequency is greater than the drive frequency.

According to an embodiment, the suspension system further includes a second resilient element engaging the rigid support, wherein the natural frequencies in one or more of the degrees of freedom of the suspension system are tuned into a narrow resonant frequency range in part by the second resilient element. According to an embodiment, the second resilient element comprises a silicone material.

According to an embodiment, the resilient element is configured to create a resilient force against all six degrees of freedom of vibrations generated by the operative element.

According to an embodiment, the resonant frequency of the suspension system is 10 or more Hertz above the drive frequency. According to an embodiment, the resonant frequency of the suspension system is less than 85 Hertz.

According to an embodiment, the drive frequency is less than 60 Hertz.

According to an embodiment, the drive frequency is between approximately 10 and 30 Hertz.

According to an embodiment, the resilient element is a spring.

According to another aspect is provided a device comprising a suspension system configured to minimize transmission of acoustic and vibrational energy generated by the device. The device includes: (i) a housing; (ii) an operative assembly positioned within the housing and comprising a drive frequency when the device is in operation; and (iii) a resilient element configured to create a resilient force against vibrations generated by the operative element in one or more degrees of freedom; where the natural frequency of a suspension mode in one or more of the degrees of freedom are tuned into a narrow resonant frequency range by the suspension, and wherein the resonant frequency is greater than the drive frequency.

According to an embodiment, the device also includes a second resilient element engaging the rigid support, wherein the natural frequencies in one or more of the degrees of freedom of the suspension system are tuned into a narrow resonant frequency range in part by the second resilient element. According to an embodiment, the second resilient element is an elastomer.

According to an embodiment, the device also includes a rigid support positioned between the housing and the operative assembly, wherein the operative assembly is positioned within the rigid support, and wherein resilient element connects the operative assembly to the rigid support.

According to an embodiment, the operative assembly is a pump assembly.

According to an embodiment, the resilient element is a spring.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. The figures showing features and ways of implementing various embodiments and are not to be construed as being limiting to other possible embodiments falling within the scope of the attached claims. Also, the drawings are not necessarily to scale, emphasis instead generally being placed upon illustrating the principles of the various embodiments.

DETAILED DESCRIPTION OF EMBODIMENTS

The present disclosure describes various embodiments of a device configured to reduce the transmission of noise and vibration frequencies from an internal component to external surfaces. More generally, Applicant has recognized and appreciated that it would be beneficial to provide a suspension system within a device that more accurately and affordably minimizes transmission of acoustic and vibrational energy. The suspension system comprises a rigid support, an operative element positioned within the rigid support and comprising a drive frequency when the device is in operation, and a suspension comprising a resilient element engaging the rigid support and configured to create a resilient force against vibrations generated by the operative element in one or more degrees of freedom. The suspension system can further include a second resilient element, such that the natural frequencies are tuned into a narrow resonant frequency range in part by the second resilient element. Additional resilient elements are also possible.

The suspension system is configured such that the natural frequency in one or more of the degrees of freedom of the suspension system are tuned into a narrow resonant frequency range, where the resonant frequency is greater than the drive frequency. For example, the drive frequency may be less than approximately 85 Hertz ("Hz"), or less than approximately 65 Hz, such as at approximately 10 to 30 Hz although other ranges are possible. The suspension system is configured such that the natural frequency in one or more of the degrees of freedom of the suspension system is approximately 10 or more Hertz above the drive frequency.

Figure 1:
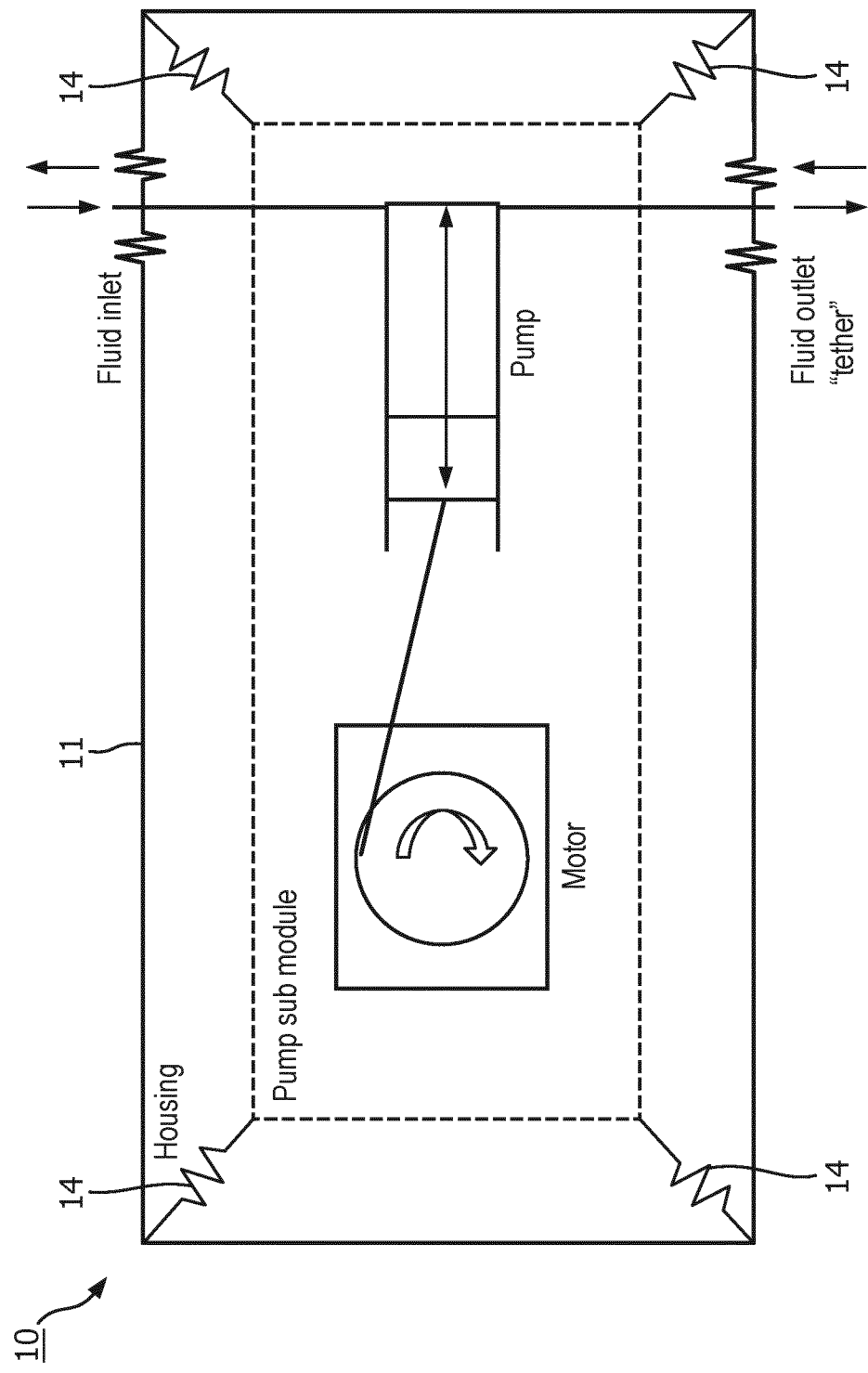
FIG. 1 is a schematic representation of force paths within a device, in accordance with an embodiment.

Referring to FIG. 1, in one embodiment, is a schematic representation of a basic sound and vibration isolation system 10, where arrows indicate a force within the system. The vibration isolation system 10 may represent and/or be incorporated within, for example, an oral irrigator, another handheld device, another consumer device, or any other device with a housing 11. In this example, the system comprises a fluid inlet and a fluid outlet, which utilizes a motor and a pump configured to move the fluid from the inlet to the outlet. According to an embodiment, the vibration isolation system 10 comprises one or more resilient elements 14 configured to suspend at least a portion of the internal components of the system, including the motor and/or pump. The suspension system comprising one or more resilient elements is configured to minimize the transmission of vibration and sound from the internal operative element, such as a motor or pump, to the housing, thereby improving the user experience. Accordingly, resilient elements 14 can be any resilient element configured to isolate and/or dampen sound and vibration, including but not limited to springs, magnets, elastomers, and many other resilient elements.

Figure 2:
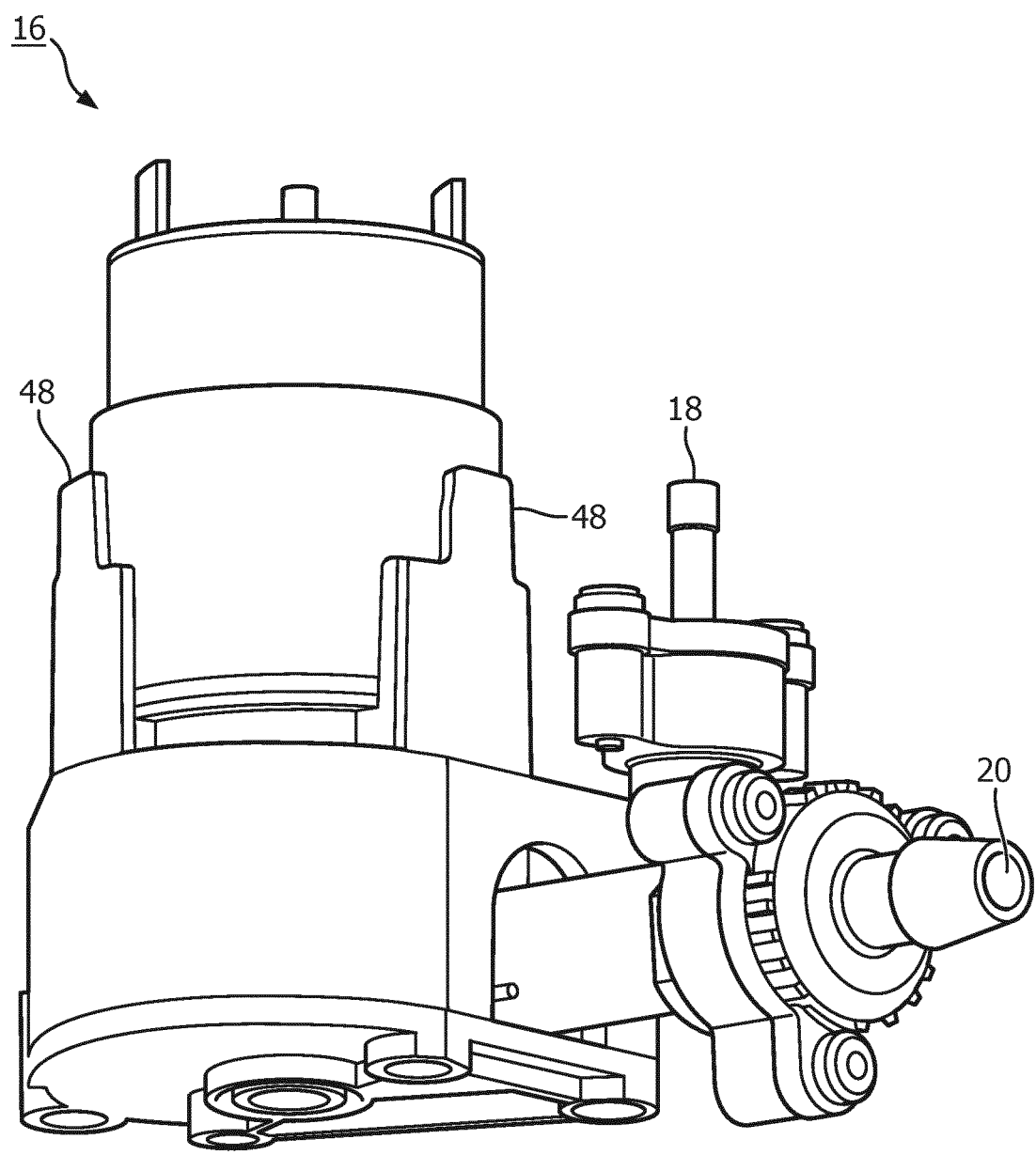
FIG. 2 is a schematic representation of an operative element of a device, in accordance with an embodiment.

Referring to FIG. 2, in one embodiment, is a schematic representation of an assembled operative element 16. In this embodiment the operative element is a pump comprising an inlet 20 and an outlet 18. The device comprises this operative element within a house of the device, which pumps fluid from the inlet to the outlet. According to just one embodiment of many possible embodiments, the operative element pumps fluid from a fluid reservoir at low pressure through the pump into a high pressure line exiting from the outlet. The operative element may operate at a wide range of different frequencies, and in this embodiment the operative element functions at less than approximately 85 Hz, or less than approximately 65 Hz, such as at approximately 10 to 30 Hz although other ranges are possible. In this device, the primary source of noise and vibration will be the fluid path and the pump and drive train. The pump and drive train will be the source for most of this vibration creating repeatable sound/vibration impulses of a fixed frequency that will also excite harmonics. Transmission of this vibration to external surfaces generates the majority of sound heard by a user, and these primary sound/vibration sources then transmit to secondary sources. These secondary sources are energized from the principal frequency and/or harmonics that move parts exposed to the user/external air that radiate sound vibrations from the principal forces to the user.

Functioning of the suspension system results in the generation of one or more natural frequencies at which the system can resonate of which the first six lowest frequencies are considered primary modes. A primary mode frequency may be, for example, the frequency that excites the system and causes it to vibrate or move in those modes. An embodiment of the operative element may comprise, for example, six primary modes which are the first three translation modes and three rotational modes. Translation is when the center of gravity of the suspended operative element moves in a line, and rotation is when the suspended operative element rotates around a pole which would conduce with the center of gravity of the suspended operative element. Depending on the embodiment of the device and/or operative element, one or more modes may not be present.

According to an embodiment, the operative element of a device may operate at a specific frequency range such as approximately 10 to 30 Hz, among many other possible ranges. To avoid resonant effects, the natural frequencies of the suspended system need to be either below or above this range. Natural frequencies are determined from the mass and stiffness properties of the operative element and the suspension. Since the mass properties of the operative element are more or less fixed, the stiffness is the primary parameter that can be varied to tune the suspension. For a narrow band of drive frequencies it is effective to have the suspension natural frequency above the drive frequency while still reducing perceived sound volume. In this narrow band of drive frequencies it is sometimes beneficial to have the suspension frequency above the drive frequency as a suspension frequency below involves larger, more complex, and thus expensive resilient elements to achieve the low suspension frequency. Suspensions below 10 Hz are in the realm of optics tables which are quite large and expensive often with active air suspensions. Low stiffness suspensions also require more moving space.

According to an embodiment, a suspension system for a device with an operative element may have several requirements for sound and vibration reduction, as well as other design specifications. According to an embodiment, the suspension system should be designed or structured to operate such that the first six natural frequencies of the suspension system and operative element are close to the operative element operating frequencies, but far enough away from the operative element operating frequencies to avoid resonance. It may also be desirable to ensure that the suspension system is affordable, fits within the provided housing, and is robust enough to survive normal use including dropping.

High damping by the suspension system will increase the transmissibility of vibration through the suspension and is not desirable in most embodiments. For example, high or critical damping means that the system loses energy quickly and this lost energy is transmitted through the suspension to the external housing. A non-critically damped system maintains more of its energy for a longer time. Critically damped means the system would not oscillate more than one cycle after being excited.

Figure 3:
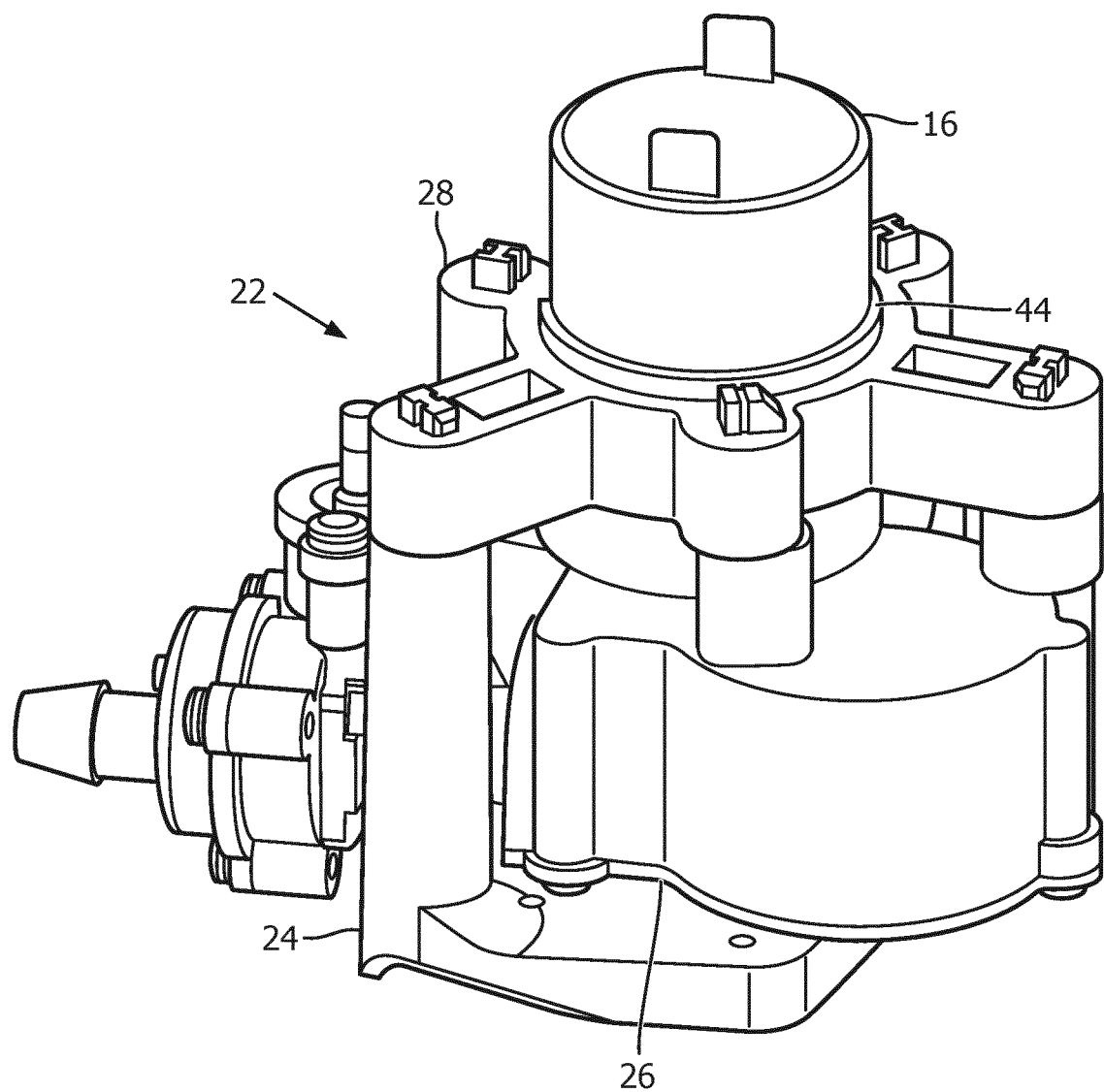
FIG. 3 is a schematic representation of one embodiment of a suspension system, in accordance with an embodiment.

Referring to FIG. 3, in one embodiment, is a schematic representation of an assembled suspension system 22 with an operative element 16, in which the operative element is suspended within the suspension system. The natural frequency in one or more of the degrees of freedom of the suspension system are tuned into a narrow resonant frequency range by the suspension, and the resonant frequency of the assembled suspension system 22 is greater than the drive frequency of operative element 16. Although FIG. 3 depicts an embodiment of a suspension system 22 and an operative element 16, this embodiment is a non-limiting example. The operative element 16 may be any other operative element 16, and the suspension system may be otherwise structured or configured such that the natural frequency in one or more of the degrees of freedom of the suspension system are tuned into a narrow resonant frequency range by the suspension and the resonant frequency of the assembled suspension system is greater than the drive frequency of the operative element.

According to this embodiment, suspension system 22 comprises a rigid support 24. The rigid support and one or more elements of the suspension are an interface between the operative element 16 and the housing or other fixed structure within the device. For example, the rigid support 24 supports the operative element 16 and one or more elements of the suspension, and facilitates the positioning of the operative element 16 and the other elements of the suspension in order to minimize sound and vibration of the operative element by tuning its natural frequencies into a narrow resonant frequency range greater than the drive frequency of the operative element. Rigid support 24 may be composed of any material sufficient to support the weight of at least the operative element 16, as well as sufficiently resist the forces exerted by the operative element 16 and restrict excessive movement, and avoid deformation over time.

Although not shown, the suspension system further includes a first resilient element 26 positioned between the rigid support 24 and the operative element 16. The first resilient element 26 is an interface between the rigid support and the operative element, and supports the weight of the operative element. The first resilient element 26 may be any component, device, or mechanism that exerts a bias and/or absorbs energy. For example, the resilient element may be one or more of any type of spring, magnet, polymer, or other material or structure that exerts a bias and/or absorbs energy. It is important that this resilient element not creep under the weight of the operative element. For example, in this embodiment, the first resilient element 26 is a metal spring that exerts a bias against the rigid support and/or operative element, and absorbs energy from the operative frequencies generated by the operative element. According to an embodiment, the resilient element is configured to create a resilient force against vibrations generated by the operative assembly in all six degrees of freedom, although other embodiments are possible.

In some embodiments, suspension system 22 further comprises a second resilient element 28 positioned between the rigid support 24 and the operative element 16 and configured to further minimize and/or absorb energy from the operative frequencies generated by the operative element. Thus, the first and second resilient elements minimize sound and vibration of the operative element to tune the natural frequencies into a narrow resonant frequency range greater than the drive frequency of the operative element.

Although FIG. 3 depicts an embodiment of a second resilient element 28, this embodiment is a non-limiting example. In this example, the second resilient element 28 is an interface between the rigid support and the operative element. The second resilient element 28 may be any component, device, or mechanism that exerts a bias and/or absorbs energy. For example, the resilient element may be one or more of any type of spring, magnet, polymer, or other material or structure that exerts a bias and/or absorbs energy. For example, in this embodiment, the second resilient element 28 is a natural or synthetic polymer having elastic properties, such as an elastomer. For example, a resilient element may comprise a silicone material, among other possible materials.

The second resilient element 28 also comprises an opening 44 that allows a portion of the operative element 16 to extend through. In other embodiments the second resilient element 28 may be positioned above the operative element.

Figure 4:
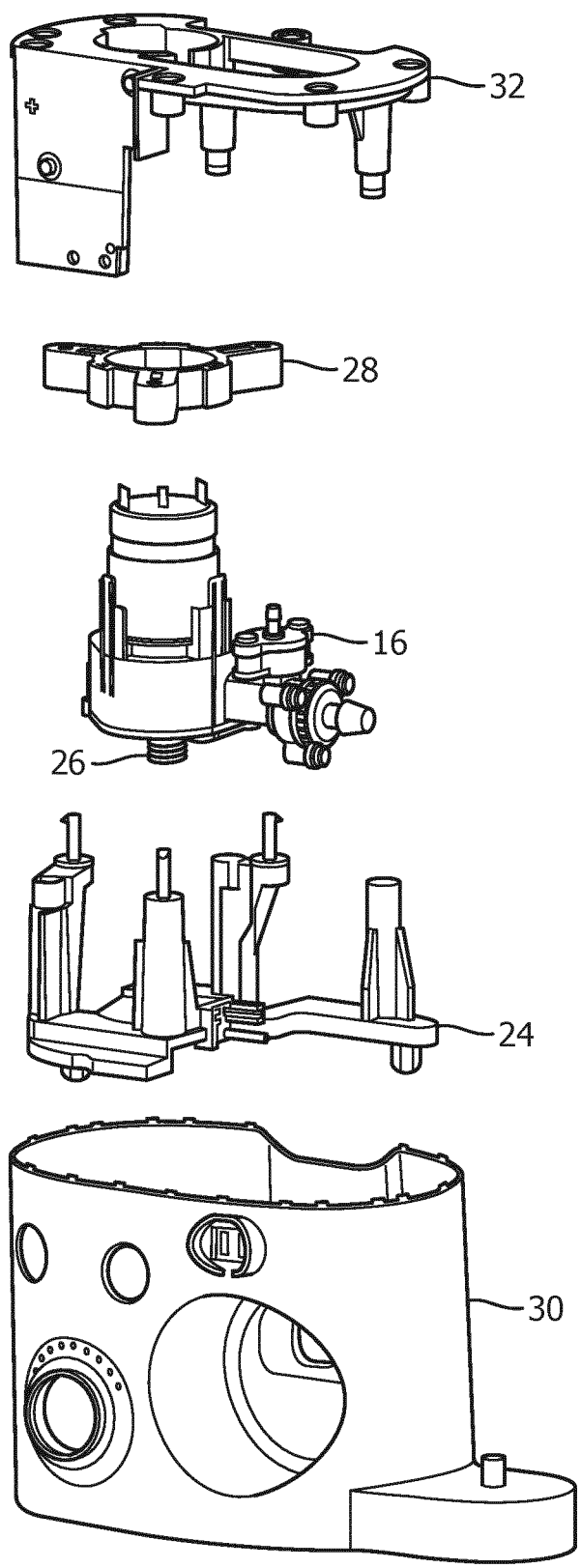
FIG. 4 is an exploded view of one embodiment of a suspension system, in accordance with an embodiment.

Referring to FIG. 4, in one embodiment, is an exploded view of a portion of a device comprising a suspension system configured to tune the natural frequencies of the system into a narrow resonant frequency range greater than the drive frequency of the operative element. Although FIG. 4 depicts a specific embodiment of this portion of a device, this embodiment is a non-limiting example. The device comprises a housing base 30 configured to contain at least a portion of the suspension system and operative element 16. The suspension system comprises a rigid support 24, first resilient element 26, and second resilient element 28. The device further comprises a frame 32 configured to interact or interlock with the rigid support, thereby further positioning and affixing the rigid support and suspension system in place.

Figure 5:
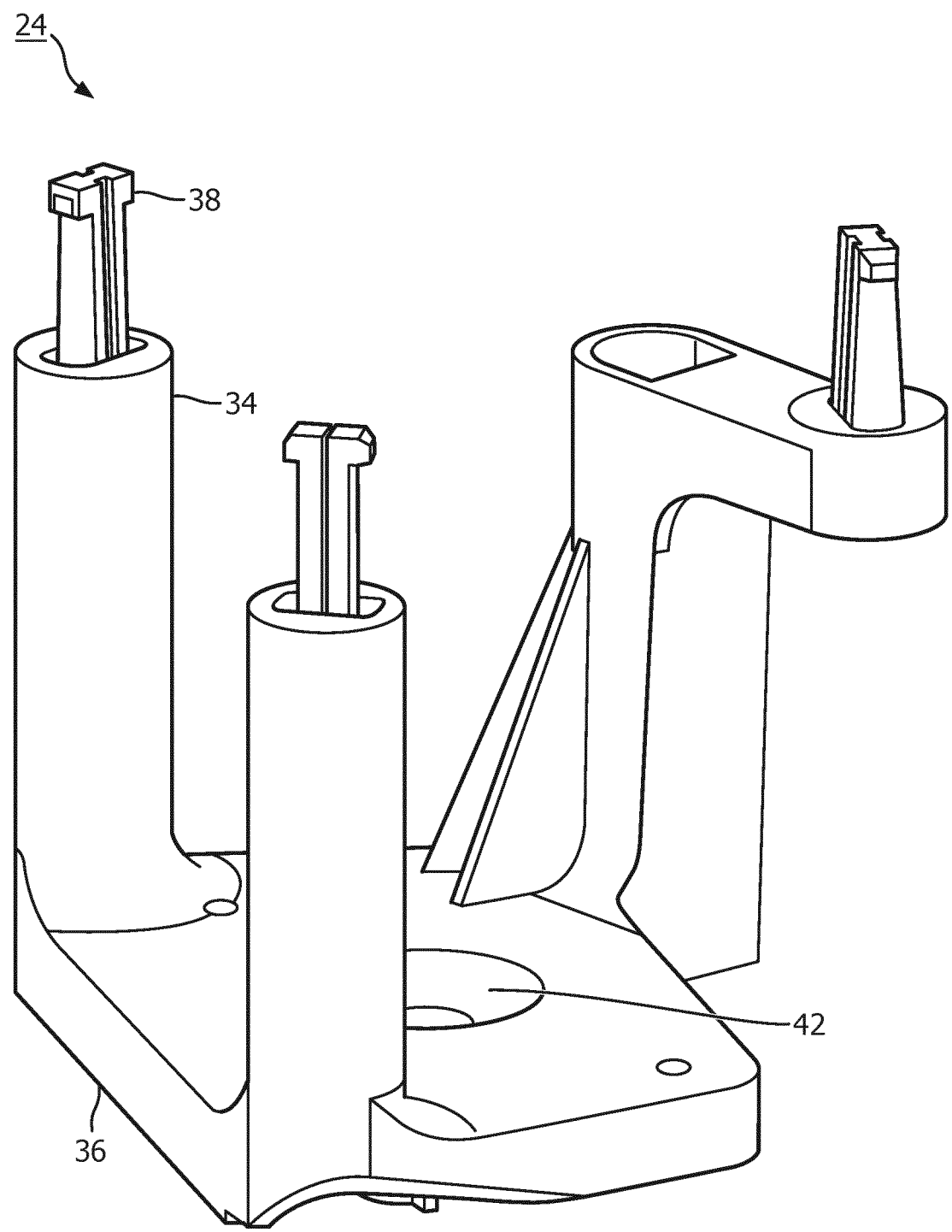
FIG. 5 is a side view schematic representation of a rigid support of a suspension system, in accordance with an embodiment.

Referring to FIG. 5, in one embodiment, is a rigid support 24. The rigid support 24 comprises three extensions 34 extending from the base 36, each ending in a prong 38 configured to fit and lock into an interlocking prong holder 40 of the second resilient element (shown in FIG. 6). The rigid support 24 also comprises a receiving portion 42 configured to position the first resilient element (not shown). The rigid support 24 may be composed of any material, including metal, plastic, or any other polymer. The rigidity of the rigid support 24 is another configurable component of the suspension system. In other words, the rigidity of the rigid support 24 can be selected to further minimize vibrations and/or noise generated and transmitted by the operative element.

Figure 6:
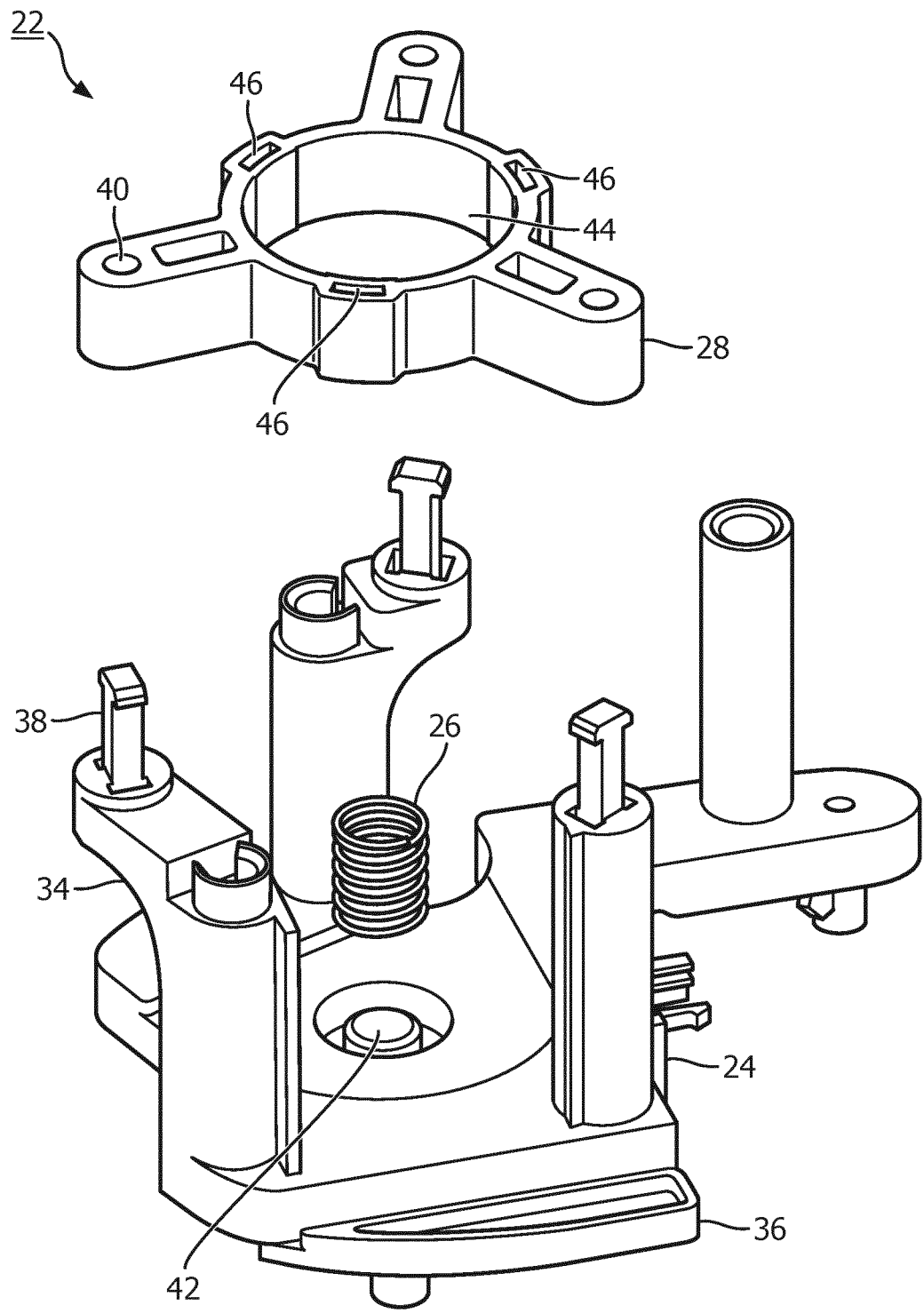
FIG. 6 is an exploded view of a rigid support and two resilient elements of a suspension system, in accordance with an embodiment.

Referring to FIG. 6, in one embodiment, is an exploded view of a suspension system 22. The suspension system comprises a rigid support 24 with a base 36, extensions 34, and prongs 38, and receiving portion 42 with a center extension. The system also comprises a first resilient element 26 configured to sit within receiving portion 42 and fit on the center extension such that the resilient element is firmly affixed within the receiving portion 42 and thus within the rigid support. When the system is assembled, the weight of the operating element will further affix the resilient element in place.

The suspension system further comprises a second resilient element 28 configured to interlock with the rigid support 24. Accordingly, the second resilient element comprises three interlocking prong holders 40 each defining a path through which, when assembled, the prongs 38 of the extensions 34 can fit into. The head of a prong, once it has passed through the entirety of the interlocking prong holder, affixes the prong in place thereby firmly affixing the rigid support and the second resilient element. The second resilient element 28 also comprises an opening 44 that allows a portion of the operative element to extend through, further affixing the operative element and further absorbing energy.

According to an embodiment, the second resilient element 28 comprises one or more motor mount slots 46. Each motor slot is configured to receive a respective motor tab 48 (shown in FIG. 2) when the suspension is assembled. The one or more motor mount slots 46 and the respective motor tabs 48 further add to the stability and functionality of the suspension and the overall system.

Figure 7:
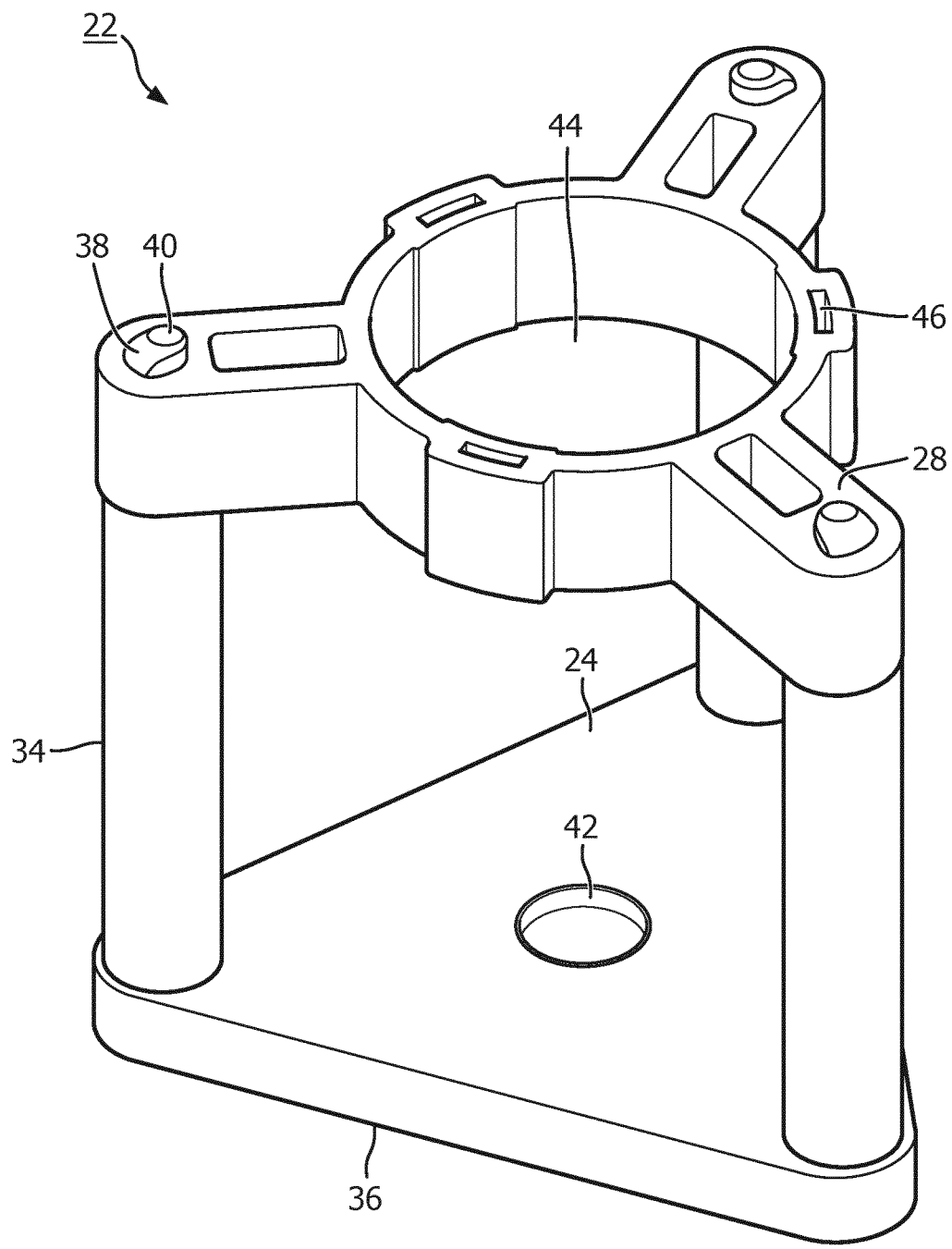
FIG. 7 is a schematic representation of an assembled rigid support and resilient element in a suspension system, in accordance with an embodiment.

Referring to FIG. 7, in one embodiment, is a schematic representation of a portion of suspension system 22 with a rigid support 24 and a second resilient element 28, without the first resilient element 26. The rigid support 24 comprises a base 36, extensions 34, and prongs 38, and a first resilient element receiving portion 42. The second resilient element 28 comprises interlocking prong holders 40 and an opening 44 that allows a portion of the operative element to extend through. In this embodiment, the rigid support and second resilient element are assembled without the operative element. Each of the prongs 38 have been extended through the interlocking prong holders 40 and the prongs now function to hold the rigid support and second resilient element interlocked.

Figure 8:
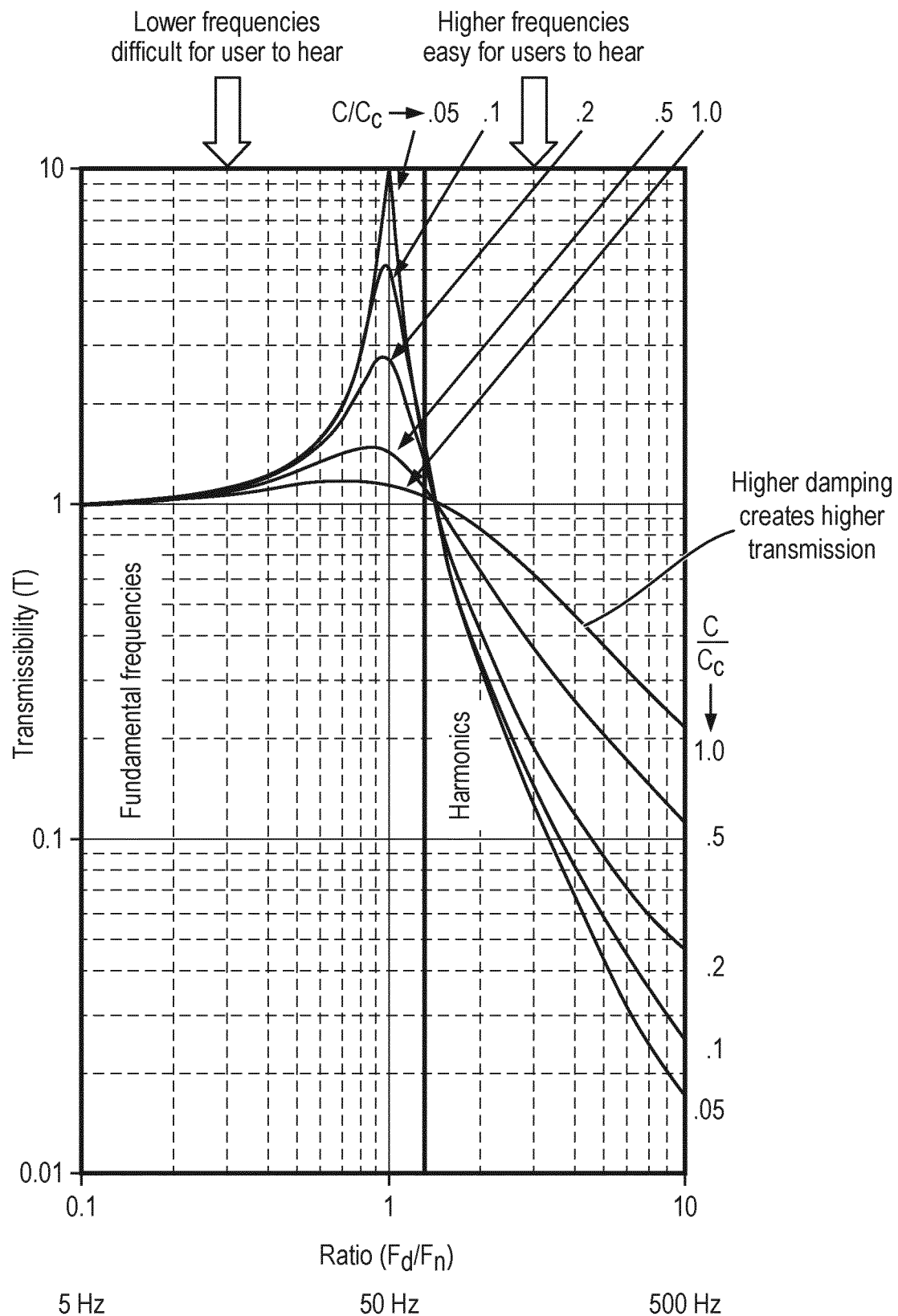
FIG. 8 is a graph of transmissibility (inverse of isolation) relative to the ratio of suspension natural frequency and fundamental (primary) vibration frequency, in accordance with an embodiment.

Referring to FIG. 8, the natural frequencies of the suspension system described or otherwise envisioned herein are higher than the fundamental frequencies of the operative element, and as designed significantly reduce more vibration and noise than prior art systems in this drive frequency range. High damping by the suspension system will increase the transmissibility of vibration through the suspension and is not desirable. To achieve this, the suspension system described or otherwise envisioned herein can take many configurations. The rigid support and first resilient element can be structured or otherwise configured in shape, material, and/or relationship in a wide variety of ways to result in a final structure such that the natural frequency in one or more of the degrees of freedom of the suspension system are tuned into a narrow resonant frequency range by the suspension, where the resonant frequency is greater than the drive frequency. Among many other configurations, the dimensions and other parameters of the resilient elements may be adjusted, including but not limited to size, shape, weight, diameter, and thickness of spring coils when it is a spring, strength of magnets when it is a magnet, and more.

Figure 9:
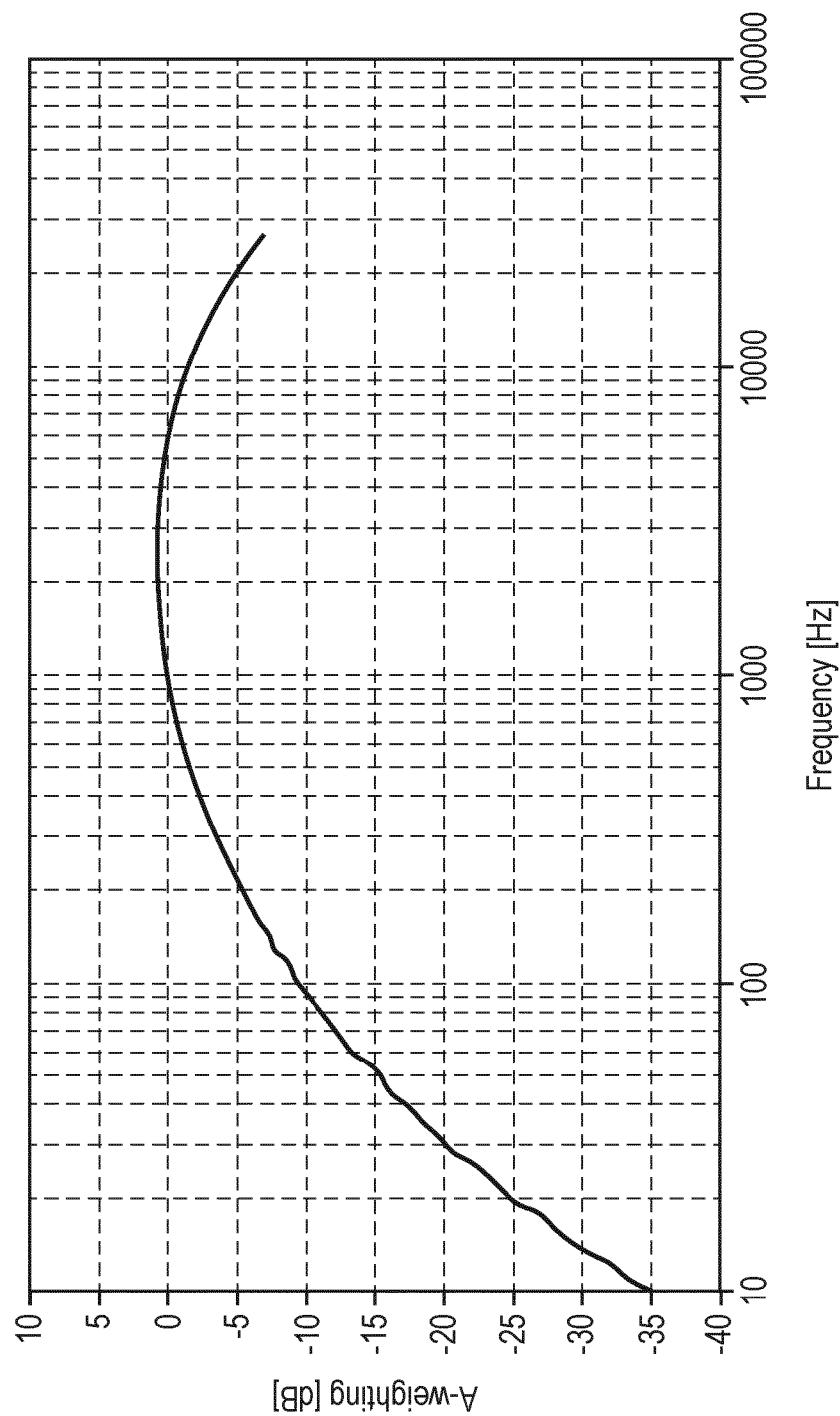
FIG. 9 is an A-weighting graph showing sound loudness of a device as perceived by a user relative to frequency at a fixed energy level, in accordance with an embodiment.
Figure 10:
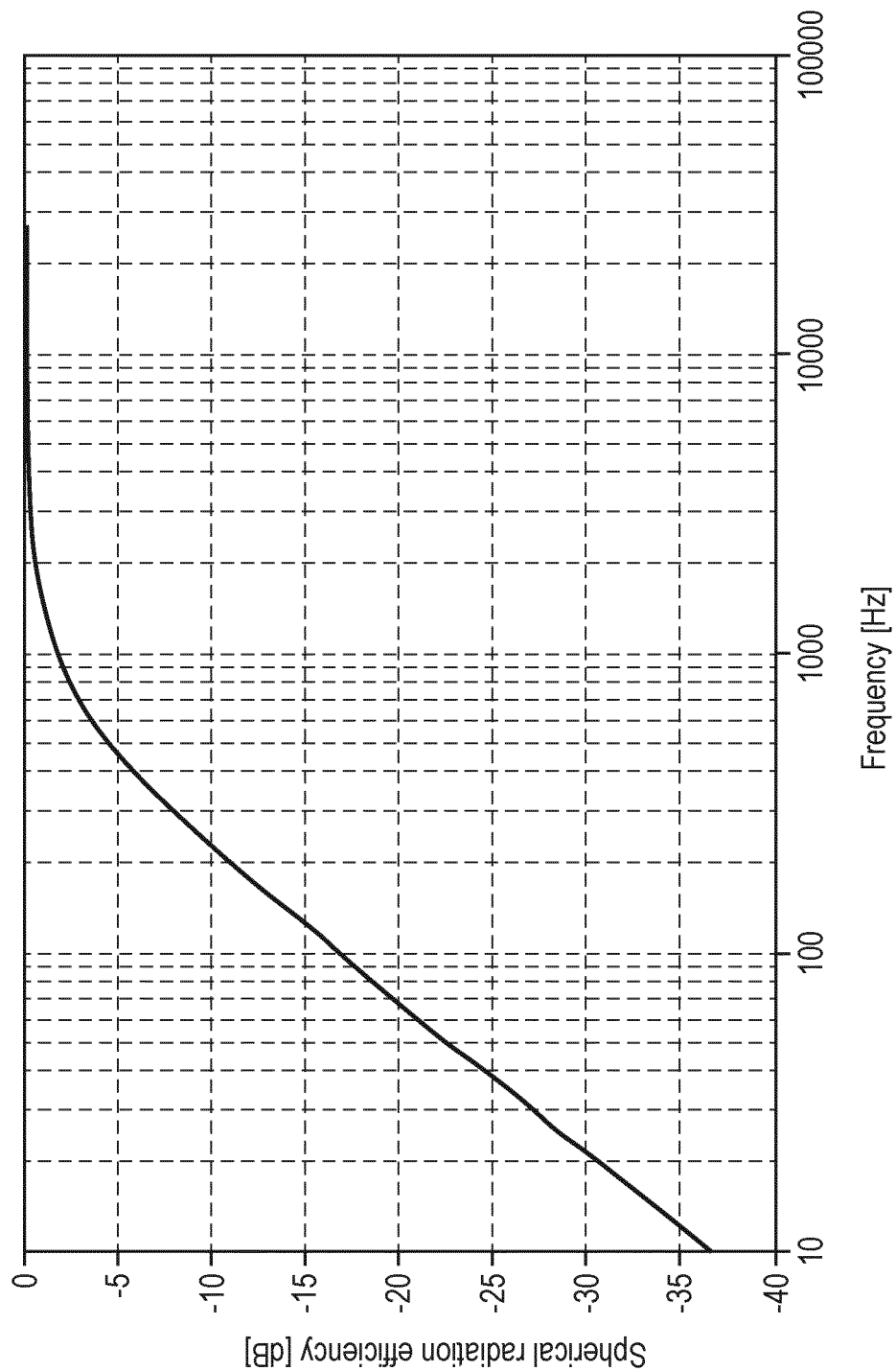
FIG. 10 is a graph showing spherical radiation efficiency, in accordance with an embodiment.
Figure 11:
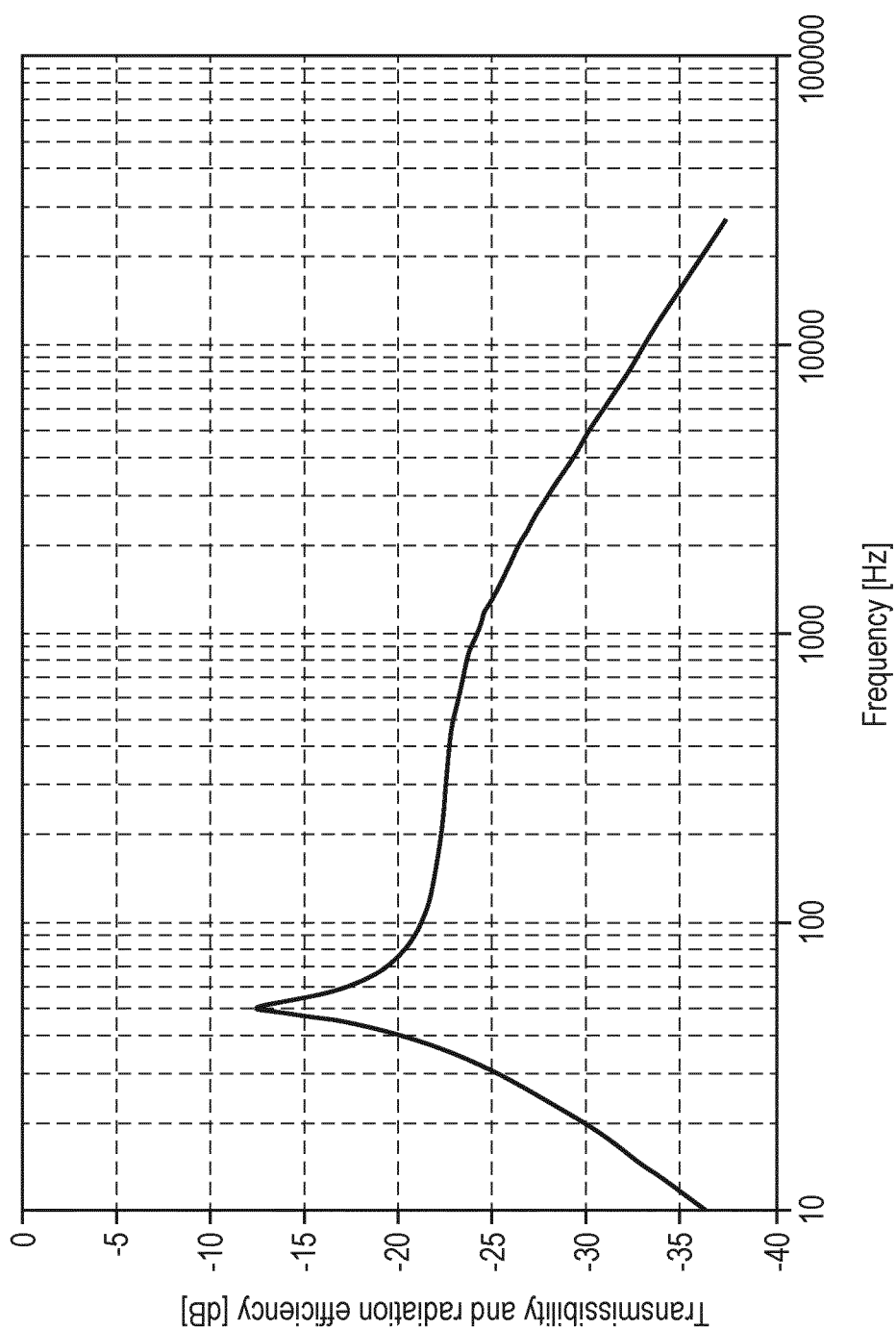
FIG. 11 is a graph showing transmissibility and radiation efficiency, in accordance with an embodiment.
Figure 12:
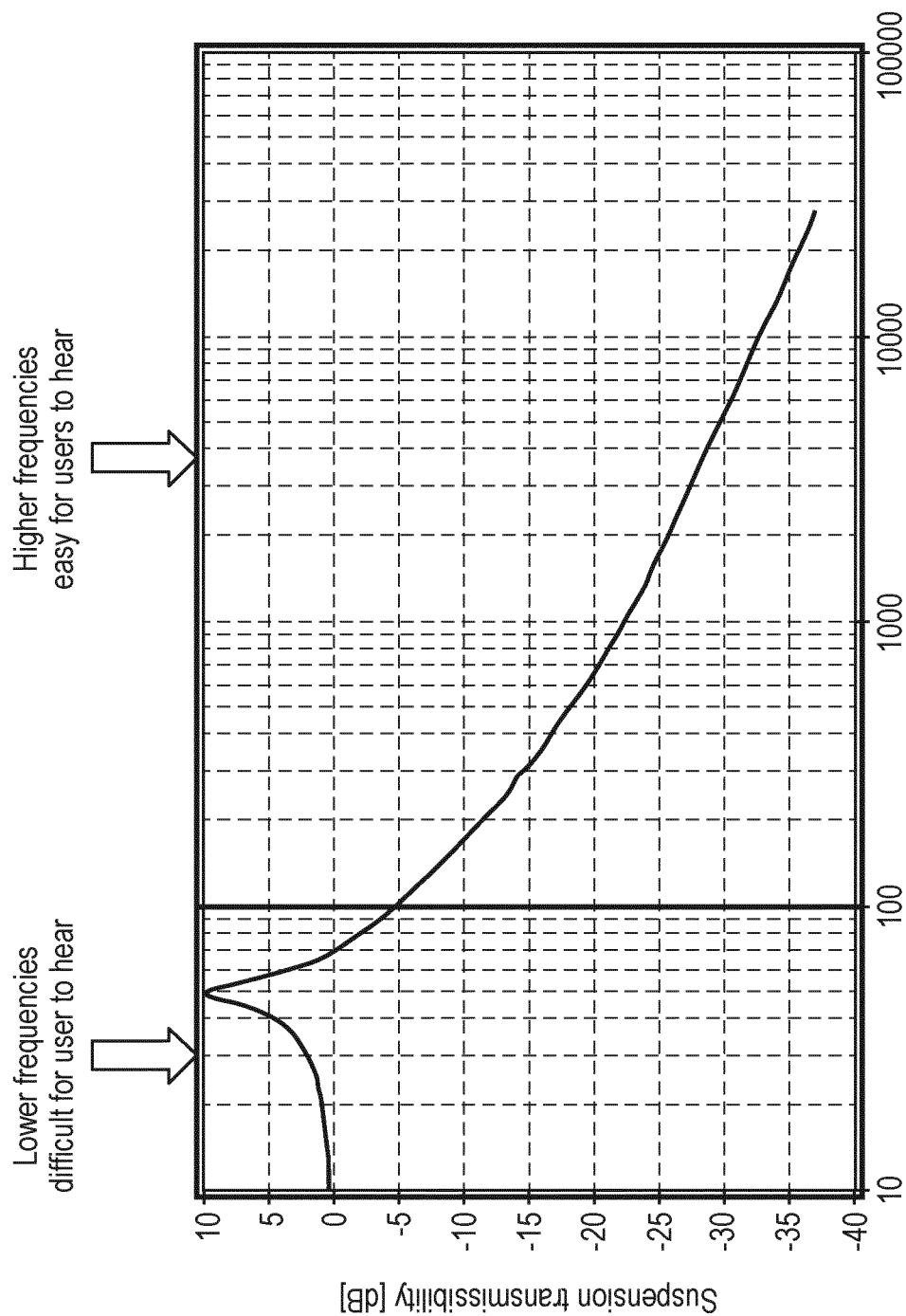
FIG. 12 is a graph of user-perceived loudness through a 50 Hz suspension system relative to frequency, in accordance with an embodiment.
Figure 13:
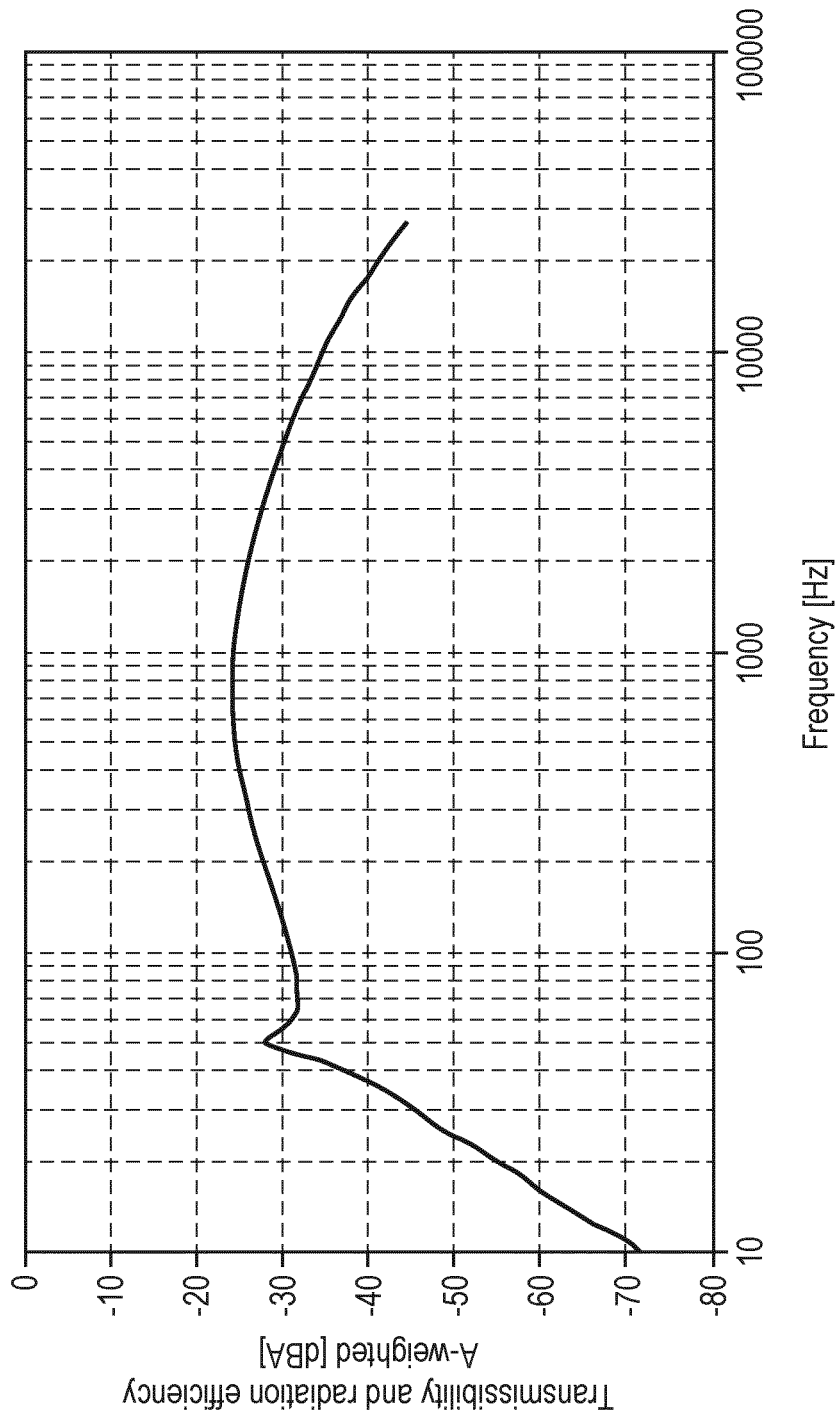
FIG. 13 is an A-weighted graph of user-perceived loudness resulting from a vibration of fixed energy relative to frequency, in accordance with an embodiment.

The suspension system described or otherwise envisioned herein significantly reduces the transmission of vibration and noise from the operative element. Referring to FIG. 9, for example is an A-weighting graph showing sound loudness as perceived by a user. A user can perceive frequencies in the mid-range much easier, and thus louder, than the low and high frequencies. The higher the sensitivity the less energy in that frequency to hear. According to an embodiment, the primary frequencies from an operative element can be approximately 10 to 30 Hz with frequencies below 20 Hz not being heard. Referring to FIG. 10 is a graph showing that low frequencies are not easily radiated by a body, as there is a need for significantly more power for a given sound energy. Similarly, referring to FIG. 11 is a graph of transmission of vibration and resulting radiation to sound energy from the suspension system. FIG. 12 is a graph of vibration transmission through the suspension system relative to frequency, and FIG. 13 is an A-weighted graph of transmission from the housing due to vibration transmitted through the suspension system.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A suspension system configured to minimize transmission of acoustic and vibrational energy in a device, comprising:
   a rigid support;
   an operative element positioned within the rigid support and comprising a drive frequency when the device is in operation;
   a first resilient element comprising a coil spring, the first resilient element engaging the rigid support and configured to create a resilient force against vibrations generated by the operative element in one or more degrees of freedom, wherein a natural frequency of a suspension mode in one or more of the degrees of freedom are tuned into a narrow resonant frequency range by the suspension, and wherein the resonant frequency is greater than the drive frequency; and
   a second resilient element comprising an elastomer, the second resilient element engaging the rigid support, wherein natural frequencies in one or more of the degrees of freedom of the suspension system are tuned into a narrow resonant frequency range in part by the second resilient element.

2. The suspension system of claim 1, wherein the resilient element is configured to create a resilient force against all six degrees of freedom of vibrations generated by the operative element.

3. The suspension system of claim 1, wherein the resonant frequency of the suspension system is 10 or more Hertz above the drive frequency.

4. The suspension system of claim 1, wherein the resonant frequency of the suspension system is less than 85 Hertz.

5. The suspension system of claim 1, wherein the drive frequency is less than 60 Hertz.

6. The suspension system of claim 1, wherein the drive frequency is between approximately 10 and 30 Hertz.

7. A device comprising a suspension system configured to minimize transmission of acoustic and vibrational energy generated by the device, comprising:
   a housing;
   an operative assembly positioned within the housing and comprising a drive frequency when the device is in operation;
   a first resilient element comprising a coil spring and configured to create a resilient force against vibrations generated by the operative assembly in one or more degrees of freedom, wherein a natural frequency of a suspension mode in one or more of the degrees of freedom are tuned into a narrow resonant frequency range by the suspension, and wherein the resonant frequency is greater than the drive frequency; and
   a second resilient element comprising an elastomer and engaging a rigid support, wherein natural frequencies in one or more of the degrees of freedom of the suspension system are tuned into a narrow resonant frequency range in part by the second resilient element.

8. The device of claim 7, further comprising a rigid support positioned between the housing and the operative assembly, wherein the operative assembly is positioned within the rigid support, and wherein resilient element connects the operative assembly to the rigid support.

9. The device of claim 7, wherein the operative assembly is a pump assembly.

10. The device of claim 7, wherein the resonant frequency of the suspension system is 10 or more Hertz above the drive frequency.

11. The device of claim 7, wherein the resonant frequency of the suspension system is less than 85 Hertz.

12. The device of claim 7, wherein the drive frequency is less than 60 Hertz.

13. The device of claim 7, wherein the drive frequency is between approximately 10 and 30 Hertz.

* * * * *